United States Patent
Hasani et al.

(10) Patent No.: US 10,715,439 B2
(45) Date of Patent: *Jul. 14, 2020

(54) LONGEST PREFIX MATCHING PROVIDING PACKET PROCESSING AND/OR MEMORY EFFICIENCIES IN PROCESSING OF PACKETS

(71) Applicant: Cisco Technology, Inc., San Jose, CA (US)

(72) Inventors: Naader Hasani, San Jose, CA (US); Shishir Gupta, Santa Clara, CA (US); David Delano Ward, Somerset, WI (US); Mohammed Ismael Tatar, Kanata (CA); Shahin Habibi, Menlo Park, CA (US); Sreedhar Ravipalli, Cupertino, CA (US); David Richard Barach, Boxborough, MA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/541,931

(22) Filed: Aug. 15, 2019

(65) Prior Publication Data

US 2019/0372896 A1    Dec. 5, 2019

Related U.S. Application Data

(63) Continuation of application No. 15/949,060, filed on Apr. 9, 2018, now Pat. No. 10,397,115.

(51) Int. Cl.
*H04L 12/743* (2013.01)
*H04L 12/745* (2013.01)

(52) U.S. Cl.
CPC ........ *H04L 45/7453* (2013.01); *H04L 45/748* (2013.01)

(58) Field of Classification Search
None
See application file for complete search history.

(56) References Cited

U.S. PATENT DOCUMENTS 6,560,610 B1    5/2003    Eatherton et al.
6,631,419 B1    10/2003   Greene
(Continued)

FOREIGN PATENT DOCUMENTS

WO    02/061625 A2    8/2002

OTHER PUBLICATIONS

Bando and Chao, "FlashTrie: Hash-based Prefix-Compressed Trie for IP Route Lookup Beyond 100Gbps," INFOCOM, 2010 Proceedings IEEE, Mar. 2010, IEEE, San Diego, CA (nine pages).
(Continued)

*Primary Examiner* — Ajit Patel
(74) *Attorney, Agent, or Firm* — The Law Office of Kirk D. Williams

(57) ABSTRACT

One embodiment performs longest prefix matching operations in one or more different manners that provides packet processing and/or memory efficiencies in the processing of packets. In one embodiment, a packet switching device determines a set of one or more mask lengths of a particular conforming entry of a multibit trie or other data structure that matches a particular address of a packet via a lookup operation in a mask length data structure. A conforming entry refers to an entry which has less than or equal to a maximum number of different prefix lengths, with this maximum number corresponding to the maximum number of prefix lengths which can be searched in parallel in the address space for a longest matching prefix by the implementing hardware. The packet switching device then per-
(Continued)

forms corresponding hash table lookup operation(s) in parallel in determining an overall longest matching prefix for the particular address.

16 Claims, 10 Drawing Sheets

(56) References Cited

U.S. PATENT DOCUMENTS

| | | |
|---|---|---|
| 6,728,732 B1 | 4/2004 | Eatherton et al. |
| 7,249,149 B1 | 7/2007 | Eatherton et al. |
| 7,349,415 B2 | 3/2008 | Rangarajan et al. |
| 7,352,739 B1 | 4/2008 | Rangarajan et al. |
| 7,483,430 B1 | 1/2009 | Yuan et al. |
| 7,613,134 B2 | 11/2009 | Rangarajan et al. |
| 7,899,067 B2 | 3/2011 | Rangarajan et al. |
| 8,625,604 B2 | 1/2014 | Bando et al. |
| 9,596,181 B1 * | 3/2017 | Goel ............... H04L 45/748 |
| 9,917,776 B2 | 3/2018 | Hasani |
| 9,979,648 B1 | 5/2018 | Singh et al. |
| 10,135,734 B1 * | 11/2018 | Singh ............... H04L 45/7453 |
| 10,397,115 B1 | 8/2019 | Hasani et al. |
| 2004/0006668 A1 | 1/2004 | Park et al. |
| 2004/0236720 A1 | 11/2004 | Basso et al. |
| 2004/0255045 A1 | 12/2004 | Lim et al. |
| 2006/0098652 A1 | 5/2006 | Singh et al. |
| 2010/0023727 A1 | 1/2010 | Lim |
| 2010/0040066 A1 | 2/2010 | Hao et al. |
| 2011/0128959 A1 | 6/2011 | Bando et al. |
| 2011/0145181 A1 | 6/2011 | Pandya |
| 2011/0292943 A1 | 12/2011 | Du et al. |
| 2012/0063189 A1 | 3/2012 | Maurya et al. |
| 2012/0136846 A1 | 5/2012 | Song et al. |
| 2012/0158729 A1 | 6/2012 | Mital et al. |
| 2013/0246651 A1 * | 9/2013 | Keen ............... H04L 45/748 709/238 |
| 2014/0003436 A1 | 1/2014 | Wang |
| 2014/0029619 A1 | 1/2014 | Patton et al. |
| 2015/0092778 A1 | 4/2015 | Jackson et al. |
| 2015/0098470 A1 | 4/2015 | Sun |
| 2016/0112319 A1 | 4/2016 | Hasani |
| 2016/0254999 A1 * | 9/2016 | Labonte ............ H04L 45/748 370/392 |
| 2018/0212877 A1 | 7/2018 | Wickeraad |
| 2019/0140951 A1 * | 5/2019 | Hong ............... H04L 45/745 |

OTHER PUBLICATIONS

Dharmapurikar et al., "Longest Prefix Matching using Bloom Filters," SIGCOMM '03, Aug. 2003, ACM Karlsruhe, Germany (twelve pages).

Waldvogel et al, "Scalable High-Speed Prefix Matching," ACM Transactions on Computer Systems, vol. 19, No. 4, Nov. 2001, New York, NY (forty-one pages).

PCT International Search Report and Written Opinion, PCT Application PCT/US2019/026153, ISA/EP, European Patent Office, Netherlands, dated May 31, 2019 (fourteen pages).

* cited by examiner

LONGEST PREFIX MATCHING PROVIDING PACKET PROCESSING AND/OR MEMORY EFFICIENCIES IN PROCESSING OF PACKETS

CROSS-REFERENCE TO RELATED APPLICATIONS

This application is a continuation of U.S. patent application Ser. No. 15/949,060, filed Apr. 9, 2018, which is hereby incorporated by reference in its entirety.

TECHNICAL FIELD

The present disclosure relates generally to sending of packets through a packet network, such as, but not limited to, processing a packet according to a longest prefix matching operation.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Packets are often forwarded in a network based on the result of a longest prefix matching operation based on an address and possibly other values extracted from the packets.

BRIEF DESCRIPTION OF THE DRAWINGS

The appended claims set forth the features of one or more embodiments with particularity. The embodiment(s), together with its advantages, may be understood from the following detailed description taken in conjunction with the accompanying drawings of which:

DESCRIPTION OF EXAMPLE EMBODIMENTS

1. Overview

Figure 1A:
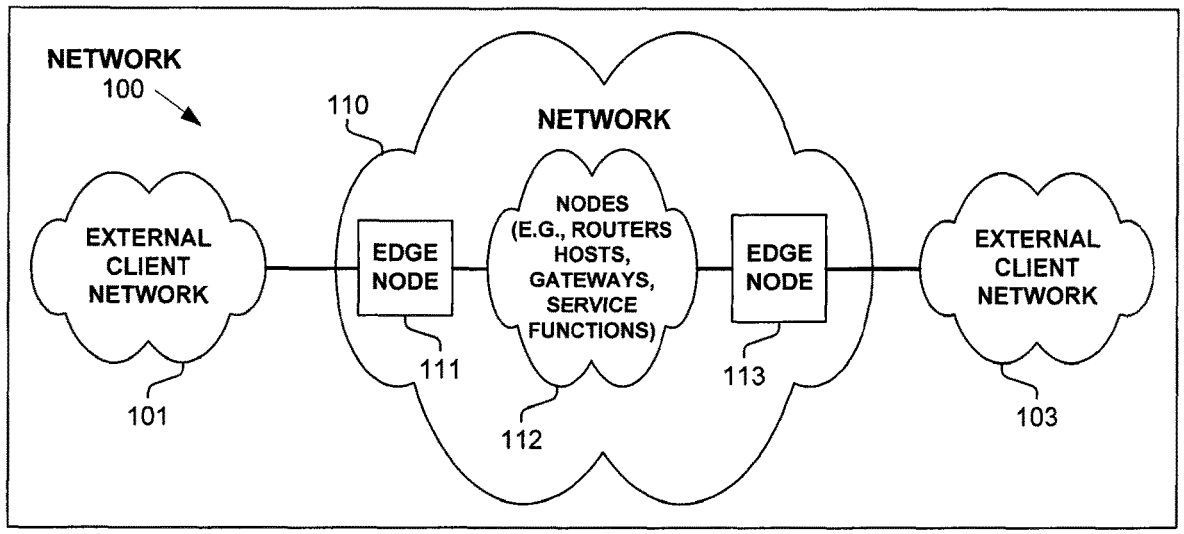
FIG. 1A illustrates a network operating according to one embodiment.

Disclosed are, inter alia, methods, apparatus, computer-storage media, mechanisms, and means associated with longest prefix matching providing packet processing and/or memory efficiencies in processing of packets. In one embodiment, a packet switching device determines a particular plurality of mask lengths of a particular conforming entry that matches a particular address of a packet via a lookup operation in a mask length data structure; and then performs corresponding hash table lookup operations in determining a longest matching prefix for the particular address. A conforming entry refers to an entry which has less than or equal to a maximum number of different prefix lengths, with this maximum number corresponding to the maximum number of prefix lengths which can be searched in parallel (e.g., overlapping in time) in the address space for a longest matching prefix by the implementing hardware.

In one embodiment, the mask length data structure includes a plurality of stored conforming entries, with each of the plurality of stored conforming entries associated with a corresponding one or more mask lengths for searching an address search space, with the address search space referring to installed prefixes that can match a lookup value. The plurality of stored conforming entries includes the particular conforming entry, and each mask length in the particular plurality of mask lengths corresponds to a searchable hash table in the address search space.

The packet switching device further determines an overall longest matching prefix in the address search space for the particular address based on the identified prefix lengths. In one embodiment, this further processing includes: for a particular mask length in the particular plurality of mask lengths performing a hash table lookup operation in said corresponding searchable hash table based on a hash key to identify a particular matching hash table entry storing the hash key and additionally storing one or more indications of corresponding one or more possible matching prefixes that are longer than the particular mask length, with the hash key including the particular address masked to said particular mask length, and responsive to said indications, matching the particular address against one of said possible matching prefixes to identify the overall longest matching prefix which is a longest matching prefix represented in the particular matching hash table entry.

In one embodiment, the packet switching device processes the particular packet based on processing information associated with the overall longest matching prefix.

In one embodiment, said corresponding one or more mask lengths for each of the plurality of stored conforming entries contains no more mask lengths than a predetermined number of mask lengths; wherein the predetermined number of mask lengths is less than or equal to the number of a plurality of different hash tables and/or memories that can be searched overlapping in time.

In one embodiment, the mask length data structure comprises a data plane multibit trie data structure that includes the plurality of stored conforming entries; and wherein the lookup operation in the mask length data structure includes traversing the data plane multibit trie data structure to the particular conforming entry. In one embodiment, the data plane multibit trie data structure uses different stride lengths, with a particular stride length from the conforming node selected from a plurality of possible stride lengths to encompass the plurality of prefixes. One embodiment includes storing in a control plane routing information base (RIB) a multibit trie data structure representing all prefixes in the address search space; wherein the data plane multibit trie data structure is a trie data structure in a forwarding information base (FIB), with the data plane multibit trie data structure representing a subset of the address search space.

In one embodiment, said one or more indications comprise a bitmap representing a plurality of prefixes that match the particular address masked to said particular mask length but are longer, with the bitmap including a plurality of bits indicating which of the plurality of prefixes are in the address search space.

One embodiment includes a method, comprising: traversing, by a packet switching device, a data plane multibit trie data structure based on a particular address of a packet to a particular conforming node that includes an identification of a particular plurality of mask lengths, with the data plane multibit trie data structure being a subset of a full multibit trie for traversing complete packet addresses such that the data plane multibit trie data structure terminates each of a plurality of branches with a conforming node of a plurality of conforming nodes, with said conforming node being defined as a node that specifies at least one but less than or equal to a predetermined number of mask lengths for searching an address search space, with the address search space referring to installed prefixes that can match a lookup value, and with at least two of the plurality of branches being different lengths in order to reach different conforming nodes of the plurality of conforming nodes. The packet switching device determines a longest matching prefix in the address search space for the particular address which includes performing a hash table lookup operation in one or more particular hash tables of a plurality of hash tables based on the particular address masked to a corresponding mask length of the particular plurality of mask lengths, with the longest matching prefix being identified in a particular hash table entry of said one or more particular hash tables identified by said hash table lookup.

In one embodiment, each mask length in the particular plurality of mask lengths corresponds to a different searchable hash table of the plurality of hash tables, with the totality of the plurality of hash tables including all said installed prefixes in the address search space. In one embodiment, each of the plurality of conforming nodes directly or indirectly refers to one or more of the plurality of hash tables. In one embodiment, none of the plurality of conforming nodes directly or indirectly refers to a same hash table of the plurality of hash tables. In one embodiment, the particular hash table entry represents multiple prefixes, including the longest matching prefix, which is longer than the particular address masked to a corresponding mask length of the particular plurality of mask lengths to reach the particular hash table entry.

2. Description

Disclosed are, inter alia, methods, apparatus, computer-storage media, mechanisms, and means associated with longest prefix matching providing packet processing and/or memory efficiencies in processing of packets, such as, but not limited to, traversing a multibit trie data structure to determine a set of mask lengths to search for an address, and then searching hash tables for the address for each of the mask length in the set of mask lengths.

Herein, the terms "mask" length and "prefix" lengths are used interchangeable. For example, the written Internet Protocol version 6 (IPv6) address 8:9:10::/48 address includes a "/48" meaning a length of forty-eight, and the IPv4 address of 8.9.10/24 includes a "/24" meaning a length of twenty-four. In common parlance, this length is referred to as the "mask length" and/or "prefix length."

Also, the term "route" is used to refer to a fully or partially expanded prefix (e.g., 10.0.0.1, 10.0.*.*, 8.9.10/24, 8:9:10::/48,), which is different than a "path" through the network which refers to a nexthop (e.g., next router) or complete path (e.g., traverse router A then router B, and so on). Also, the use of the term "prefix" without a qualifier herein refers to a fully or partially expanded prefix. As used herein, "forwarding information" includes, but is not limited to, information describing how to process (e.g., forward, send, manipulate, modify, change, drop, copy, duplicate, receive) corresponding packets. In one embodiment, determining forwarding information is performed via an ingress lookup operation and an egress lookup operation. Also, the term "processing" when referring to processing of a packet process refers to a broad scope of operations performed in response to a packet, such as, but not limited to, forwarding/sending, dropping, manipulating/modifying/changing, receiving, duplicating, creating, applying one or more service or application functions to the packet or to the packet switching device (e.g., updating information), etc. Also, as used herein, the term processing in "parallel" is used in the general sense that at least a portion of two or more operations are performed overlapping in time.

As described herein, embodiments include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., as well as "particular" and "specific" are typically used herein to denote different units (e.g., a first widget or operation, a second widget or operation, a particular widget or operation, a specific widget or operation). The use of these terms herein does not necessarily connote an ordering such as one unit, operation or event occurring or coming before another or another characterization, but rather provides a mechanism to distinguish between elements units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC § 101 machine statutory class.

Disclosed are, inter alia, methods, apparatus, computer-storage media, mechanisms, and means associated with longest prefix matching providing packet processing and/or memory efficiencies in processing of packets, such as, but not limited to, traversing a multibit trie data structure to determine a set of mask lengths to search for an address, and then searching hash tables for the address for each of the mask length in the set of mask lengths.

FIG. 1A illustrates network 100 operating according to one embodiment. As shown, network 100 includes client networks 101 and 103 (which are the same network in one embodiment, and typically include hosts, nodes, routers, etc.) external to provider network 110, which includes edge nodes 111 and 113 and a network 112 of network nodes including routers, hosts, nodes, gateways, service functions, etc. In one embodiment, edge nodes 111 and 113 typically encapsulate native packets received from networks 101 and 103 into Segment Routing or Multiprotocol Label Switching packets according to a data plane ascertained policy via a longest prefix matching operation on an address of a received packet, and subsequently decapsulate native packets from the encapsulated packets and forward the native packets into network 101 and 103.

Figure 1B:
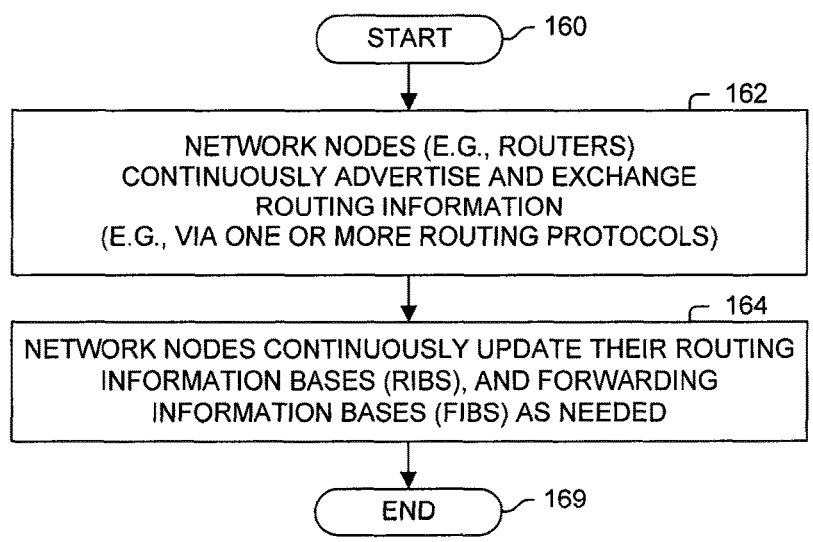
FIG. 1B illustrates a process according to one embodiment.

FIG. 1B illustrates a process according to one embodiment associated with distributing routing information among nodes in networks. Processing begins with process block 160. In process block 162, network routers and other nodes in the network(s) continuously advertise and exchange routing and other information (e.g., IPv4 or IPv6 topology information) via one or more routing protocols and/or via one or more label distribution protocols. In process block 164, network routers continuously update their routing policies and/or routing information as required (e.g., based on information received via a routing protocol, from a network management system, etc.). Processing of the flow diagram of FIG. 1B is complete as indicated by process block 169.

Figure 2A:
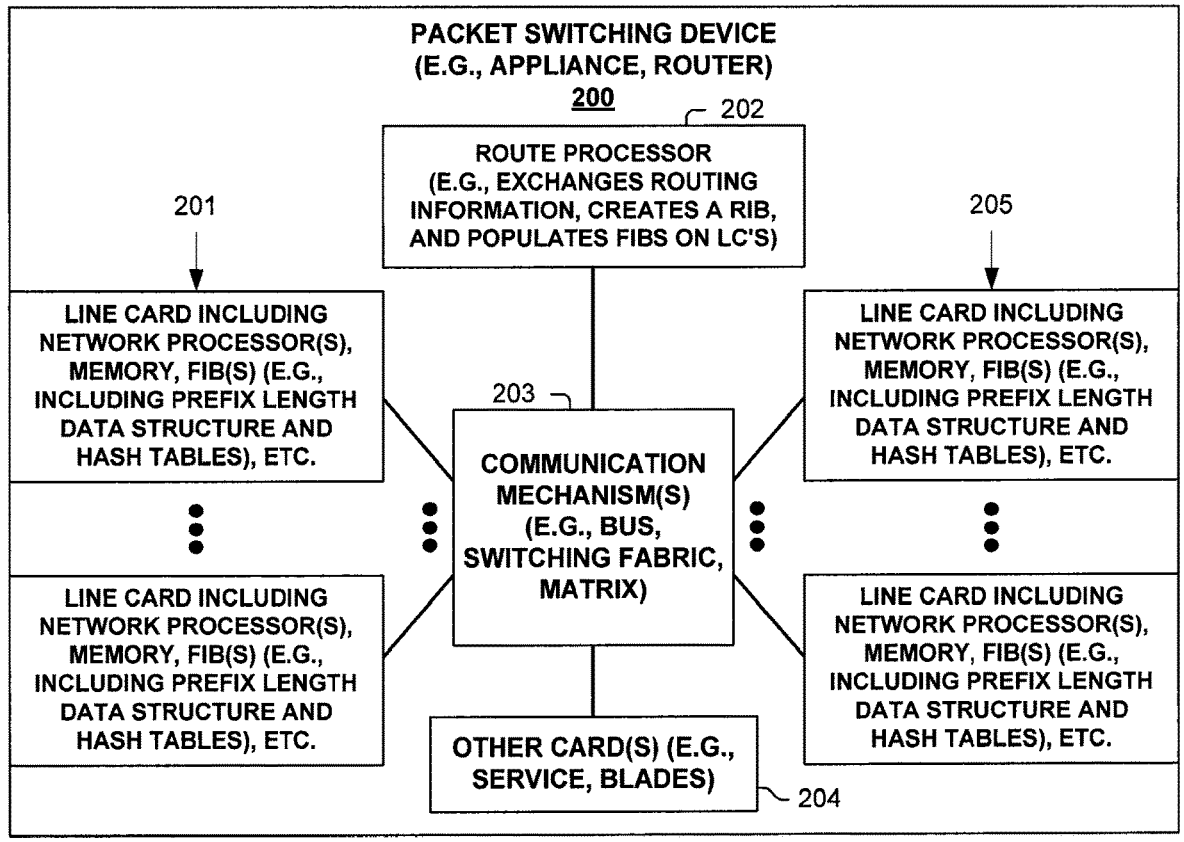
FIG. 2A illustrates a packet switching device according to one embodiment.
Figure 2B:
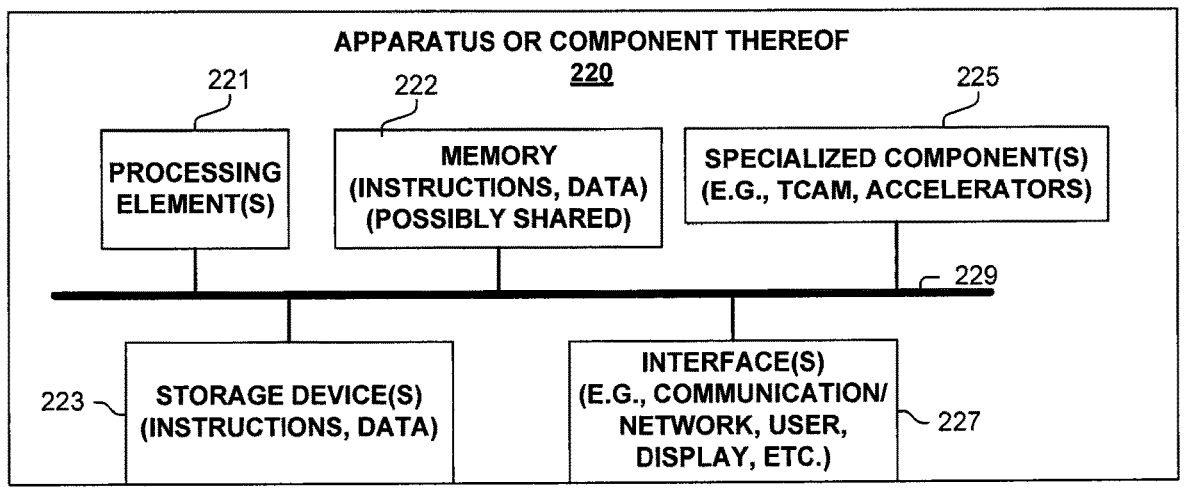
FIG. 2B illustrates an apparatus according to one embodiment.
Figure 2C:
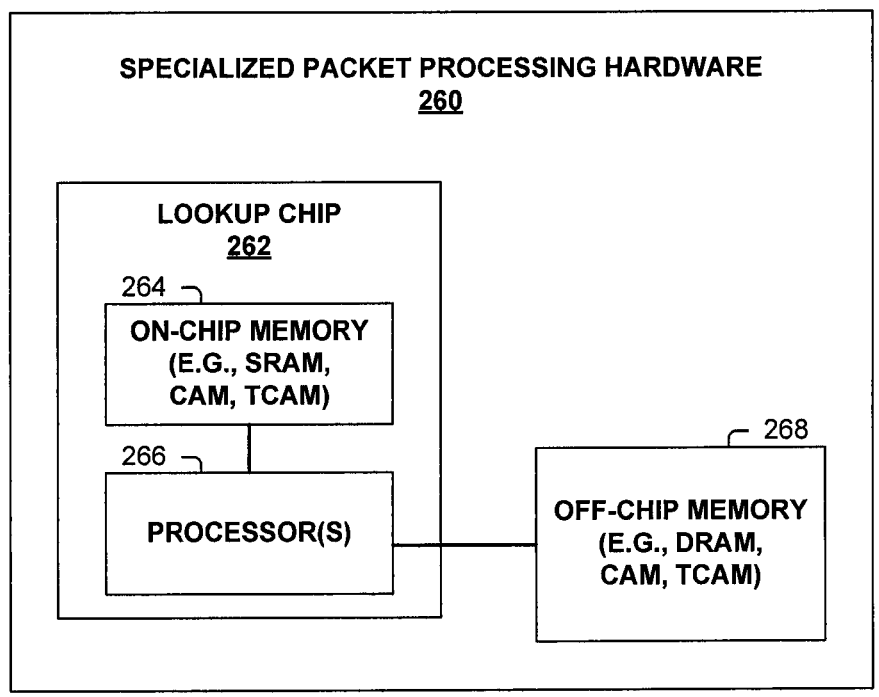
FIG. 2C illustrates a specialized packet processing hardware according to one embodiment.

FIGS. 2A-C and their discussion herein provide a description of various network nodes or portions thereof according to one embodiment.

FIG. 2A illustrates one embodiment of a packet switching device 200 (e.g., appliance, router) according to one embodiment. As shown, packet switching device 200 includes multiple line cards 201 and 205, each with one or more network interfaces for sending and receiving packets over communications links (e.g., possibly part of a link aggregation group), and with one or more processing elements that are used in one embodiment associated with longest prefix matching providing packet processing and/or memory efficiencies in processing of packets, such as, but not limited to, traversing a multibit trie data structure to determine a set of mask lengths to search for an address, and then searching hash tables for the address for each of the mask length in the set of mask lengths. Packet switching device 200 also has a control plane with one or more processing elements 202 for managing the control plane and/or control plane processing of packets associated with longest prefix matching providing packet processing and/or memory efficiencies in processing of packets. The control plane is typically mostly performed by one or more route processors, such as on a board or card (202). In one embodiment, the control plane includes one or more route processors external to the packet switching device which may be advantageous for smaller or limited processing capability packet switching devices.

Packet switching device 200 also includes other cards 204 (e.g., service cards, blades) which include processing elements that are used in one embodiment to process packets associated with longest prefix matching providing packet processing and/or memory efficiencies in processing of packets, and some hardware-based communication mechanism 203 (e.g., bus, switching fabric, and/or matrix, etc.) for allowing its different entities 201, 202, 204 and 205 to communicate. Line cards 201 and 205 typically perform the actions of being both an ingress and egress line card, in regards to multiple other particular packets and/or packet streams being received by, or sent from, packet switching device 200. In one embodiment, longest prefix matching as described herein is implemented on each of line cards 201, 205.

FIG. 2B is a block diagram of an apparatus 220 used in one embodiment associated with longest prefix matching providing packet processing and/or memory efficiencies in processing of packets, such as, but not limited to, traversing a multibit trie data structure to determine a set of mask lengths to search for an address, and then searching hash tables for the address for each of the mask length in the set of mask lengths. In one embodiment, apparatus 220 performs one or more processes, or portions thereof, corresponding to one of the flow diagrams illustrated or otherwise described herein, and/or illustrated in another diagram or otherwise described herein.

In one embodiment, apparatus 220 includes one or more processor(s) 221 (typically with on-chip memory), memory 222 (possibly including shared memory), storage device(s) 223, specialized component(s) 225 (e.g. optimized hardware such as for performing lookup and/or packet processing operations and/or service function, associative memory, binary and/or ternary content-addressable memory, etc.), and interface(s) 227 for communicating information (e.g., sending and receiving packets, user-interfaces, displaying information, etc.), which are typically communicatively coupled via one or more communications mechanisms 229 (e.g., bus, links, switching fabric, matrix), with the communications paths typically tailored to meet the needs of a particular application.

Various embodiments of apparatus 220 may include more or fewer elements. The operation of apparatus 220 is typically controlled by processor(s) 221 using memory 222 and storage device(s) 223 to perform one or more tasks or processes. Memory 222 is one type of computer-readable/ computer-storage medium, and typically comprises random access memory (RAM), read only memory (ROM), flash memory, integrated circuits, and/or other memory components. Memory 222 typically stores computer-executable instructions to be executed by processor(s) 221 and/or data which is manipulated by processor(s) 221 for implementing functionality in accordance with an embodiment. Storage device(s) 223 are another type of computer-readable medium, and typically comprise solid state storage media, disk drives, diskettes, networked services, tape drives, and other storage devices. Storage device(s) 223 typically store computer-executable instructions to be executed by processor(s) 221 and/or data which is manipulated by processor(s) 221 for implementing functionality in accordance with an embodiment.

FIG. 2C illustrates specialized packet processing hardware 260 according to one embodiment. As shown, specialized packet processing hardware 260 includes one or more lookup chips 262, which includes one or more processors 266 and on-chip memory 264 (e.g., SRAM, binary and/or ternary content-addressable memory). In addition, packet switching device 260 includes off-chip memory 268 (e.g., DRAM, binary and/or ternary content-addressable memory). In one embodiment, specialized packet processing hardware 260 performs lookup operations on a prefix resulting in the determination of one or more mask lengths, such as, but not limited to, via a hardware ternary content-addressable memory (which performs parallel lookup operations on its entries) and an adjunct memory lookup operation, via traversing a trie, or via another operation. In one embodiment, specialized packet processing hardware 260 performs a hash-based lookup operation to determine a longest matching prefix for a lookup value. In one embodiment, processor(s) 266 perform hash-based address matching on hash tables stored in on-chip memory 264, stored in off-chip memory 268, and/or partially stored in each of on-chip memory 264 and off-chip memory 268.

Figure 3A:
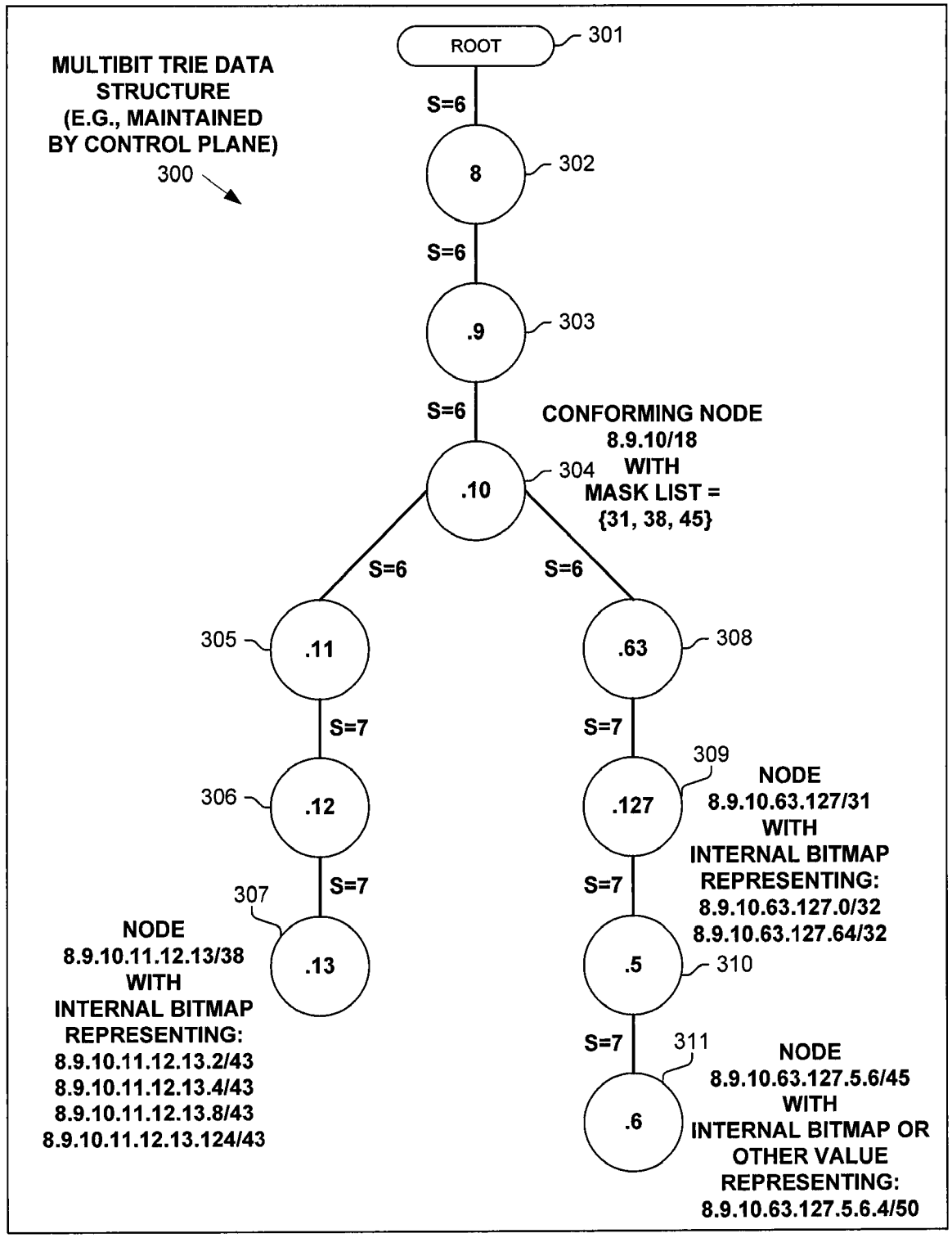
FIG. 3A illustrates a multibit trie data structure according to one embodiment.
Figure 3B:
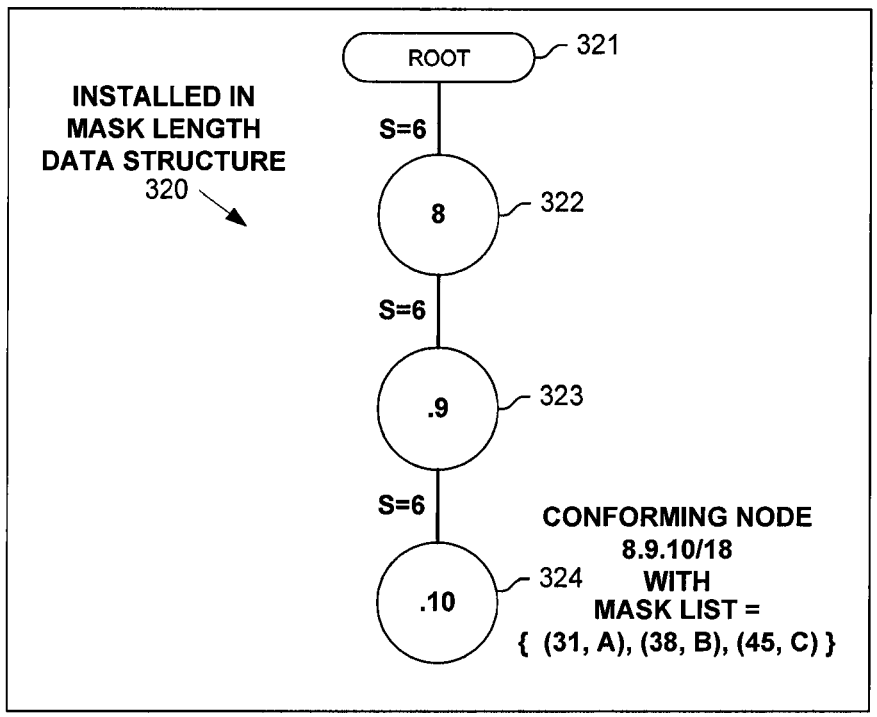
FIG. 3B illustrates a mask length data structure according to one embodiment.
Figure 3C:
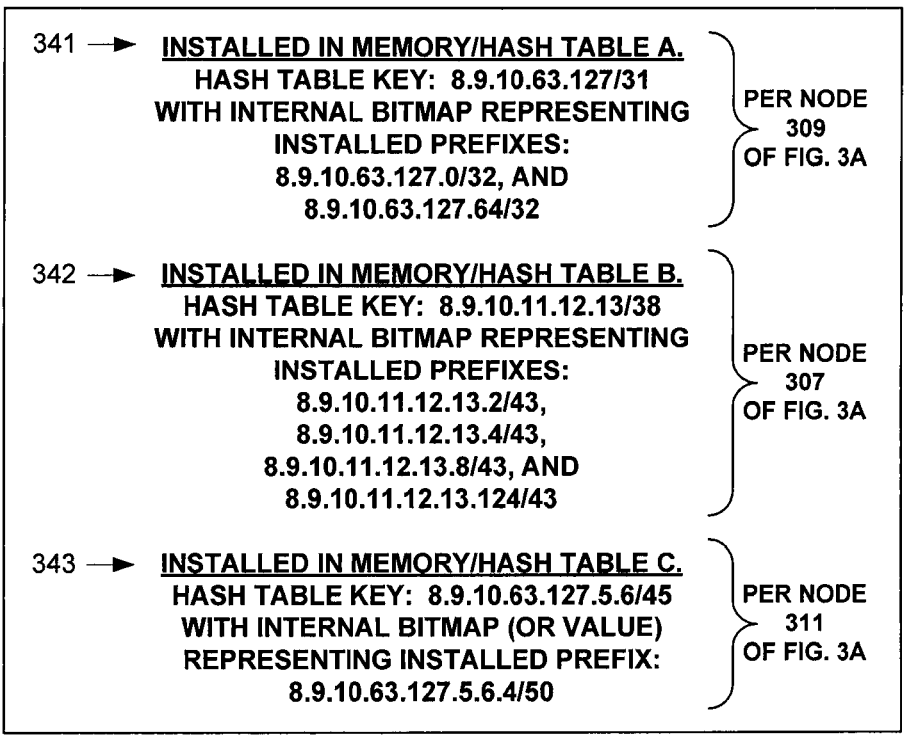
FIG. 3C illustrates hash table entries stored in hash tables according to one embodiment.

FIGS. 3A-C illustrates a multibit trie data structures and hash table data structure populated according to one embodiment. One embodiment performs longest prefix matching operations while providing packet processing and/or memory efficiencies. In one embodiment, data plane processing of packets includes performing a longest prefix matching operation by traversing a multibit trie data structure to a matching conforming node, and then performing one or more hash table lookup operations, typically in parallel, for each of the prefix lengths identified by the conforming node. A multibit or other trie data structure that is populated with complete branches to leaf nodes for all prefixes in the address space is not required in the data plane. Thereby, the memory footprint for storing the trie data structure in the data plane is significantly reduced; and the resources (e.g., number of memory accesses, parsing of trie nodes) required to traverse the trie are also significantly reduced as the traversal ends at a matching conforming node.

This longest prefix matching operation also reduces the number of hash table lookup operations by limiting them to the number in a targeted smaller subset of mask/prefix lengths for the particular address on which the lookup operation is being performed. In one embodiment, the hash tables for the targeted smaller subset of mask/prefix lengths are distributed in different memories such that parallel lookup operations can be performed thereon. In one embodiment, each of these hash tables corresponds to a small portion of the full trie, with that portion being at most for all nodes at or below the conforming node in the full trie and typically only for one prefix length. Thus, these small hash tables can be distributed and stored in the memories in a more efficient and flexible manner.

By using a variable length stride trie data structure (e.g., a multibit trie data structure), one embodiment uses a smaller trie data structure than if only a single predetermined stride length could be used. Further in one embodiment, a stride length can be dynamically adjusted to capture more prefixes populated in a trie node (e.g., such as represented by a tree bitmap), thus reducing the number of memory retrieval operations required for traversing the trie data structure, as well as reducing the size of the trie data structure.

In one embodiment, a complete multibit trie data structure, typically using tree bitmap constructs, is stored in the control plane of the packet switching device (e.g., in the routing information base or "RIB"). The data plane is populated with a subset thereof (e.g., ending at a conforming node for each branch) is then populated in each of the forwarding information bases (FIBs) on which a longest prefix matching operation for this address space is performed in real-time on packets. Both the RIB and the FIBs are dynamic in nature, as the topology and other routing information in the network is often dynamic.

Shown in FIG. 3A is a multibit trie data structure 300 including nodes 301-311 maintained by a control plane of a packet switching device according to one embodiment. Stride lengths are marked by "S=t," where t is the number of bits in the stride. In the center of each node 302-311 is denoted the next portion of the prefix (corresponding to an IPv6 address) represented therein. For explanation purposes of one embodiment described in FIGS. 3A-C, the "dot" notation of A.B.C/ML is used, where each of A, B, and C are values of a corresponding stride length "S=t" (e.g., each having a corresponding t number of bits, with t possibly varying among strides of a represented value), and ML is the mask length.

In contrast, IPv4 notation of w.x.y.z/ML refers to the values of w, x, y, and z with the (default) stride length being eight bits (an octet) for each of w, x, and y in this example, with the stride of the value for z possibly being smaller based on the mask length ML (e.g., ML minus twenty-four). Similarly, IPv6 notation of w:x:y:z/ML refers to the values of w, x, y, and z with the (default) stride length being sixteen bits (a hexadecimal value) for each of w, x, and y in this example, with the stride of the value for z possibly being smaller based on ML (e.g., ML minus forty-eight), and the corresponding values for strides after the "::" all being zero.

Referring to FIG. 3A, the routing information base (RIB) in the control plane is populated with illustrated seven prefixes of: 8.9.10.11.12.13.2::/43, 8.9.10.11.12.13.4::/43, 8.9.10.11.12.13.8::/43, 8.9.10.11.12.13.124::/43, 8.9.10.63.127.3::/32, 8.9.10.63.127.64::/32, and 8.9.10.63.127.5.6.4::/50. Based on selection of stride lengths in forming the multibit trie data structure 300, only three nodes 307, 309, and 311 are required to represent these seven prefixes (e.g., as bitmaps or other encoding within these three nodes represents that these seven prefixes are populated in the RIB (and others within the scope of a node are not populated in the RIB).

The prefix represented by node 307 is 8.9.10.11.12.13::/38, which is not a possible matching prefix (e.g., it is not populated in the address space). However, this node 307 contains an internal bitmap (or other encoding) signaling that the four listed prefixes (of the seven populated prefixes) are included in the RIB. Note, each of these four populated prefixes are longer than the prefix of 8.9.10.11.12.13::/38 represented by node 307. In one embodiment, the prefix 8.9.10.11.12.13::/38, represented by node 307, is populated in the address space and includes an indication/encoding representing such. Similarly, node 309 represents two of these seven populated prefixes and node 311 represents one of these seven populated prefixes; which are correspondingly indicated by an internal bitmap or other encoding within each node. One embodiment simply lists the additional bits of the represented prefix rather than using a bitmap as an optimization to reduce the size of node 311 (e.g., by not including a larger bitmap than required to represent the populated prefix(es)).

In one embodiment, multibit trie data structure 300 is installed in its entirety (or a substantial portion thereof) in the data plane such that longest prefix matches can be performed (e.g., as taught by tree bitmap) thereon to determine matching results against populated prefixes.

However and in one embodiment, a different approach is implemented. Shown in FIG. 3A is conforming node 304 representing prefix 8.9.10::/18. Because of the selection of strides in multibit trie data structure 300, each prefix in the address search space is represented by one of three nodes 307, 309, and 311. Therefore, as shown in FIG. 3A, all populated prefixes at or below node 304 are represented in a node of one of the three mask lengths of 31, 38, 45. Node 304 is a conforming node as long as this number of prefix lengths is less than or equal to a predetermined maximum value, which typically represents the maximum number of hash table lookup operations or memories that can be accessed simultaneously.

As prefixes are added and removed, multibit trie data structure 300 will be updated and can change dramatically. For example, prefixes having new mask lengths below node 304 might cause node 304 to no longer be a conforming node, and one or more nodes below node 304 might be the first encountered conforming node when traversing the data structure. In one embodiment, conforming node 304 might be conforming for some, but not all, of its children; or remain a conforming node and having multiple different conforming mask lists corresponding to different children.

In one embodiment, a portion of multibit trie data structure 300 of FIG. 3A is installed in the data plane, such as in mask length data structure 320 of FIG. 3B. Shown are three nodes 322-324 which correspond to nodes 302-324 of FIG. 3A. Based on a prefix of 8.9.10::/18, data structure 320 is traversed to conforming node 324, from which the mask list of the three tuples (31, A), (38, B), (45, C) is retrieved. The values of A, B, and C represent a hash table or memory to be searched for that corresponding mask length, such as shown in FIG. 3C.

As shown in FIG. 3C, programmed in memory/hash table A (341) is hash table key 8.9.10.63.127::/31 with an internal bitmap (or other encoding) representing the two installed prefixes; programmed in memory/hash table B (342) is hash table key 8.9.10.11.12.13::/38 with an internal bitmap (or other encoding) representing the four installed prefixes; and programmed in memory/hash table C (343) is hash table key 8.9.10.63.127.5.6::/45 with an internal bitmap, specified value, or other encoding representing the one installed prefix.

Thus, in one embodiment, data plane processing to acquire forwarding information for a packet includes traversing the trie in mask length data structure 320 of FIG. 3B to a conforming node based on a destination address of the packet resulting in one or more mask lengths on which to search and the location of the corresponding hash tables to search. Then, such as illustrated by FIG. 3C, hash table lookup operations are performed for the destination address masked to these retrieved prefix/mask lengths in corresponding hash tables to determine a longest matching prefix, if any, from each hash table lookup operation. The overall longest matching prefix is the longest of these matched prefixes, if any, with forwarding information typically being retrieved from memory based on a pointer or other value associated with the overall longest matching prefix.

Figure 4A:
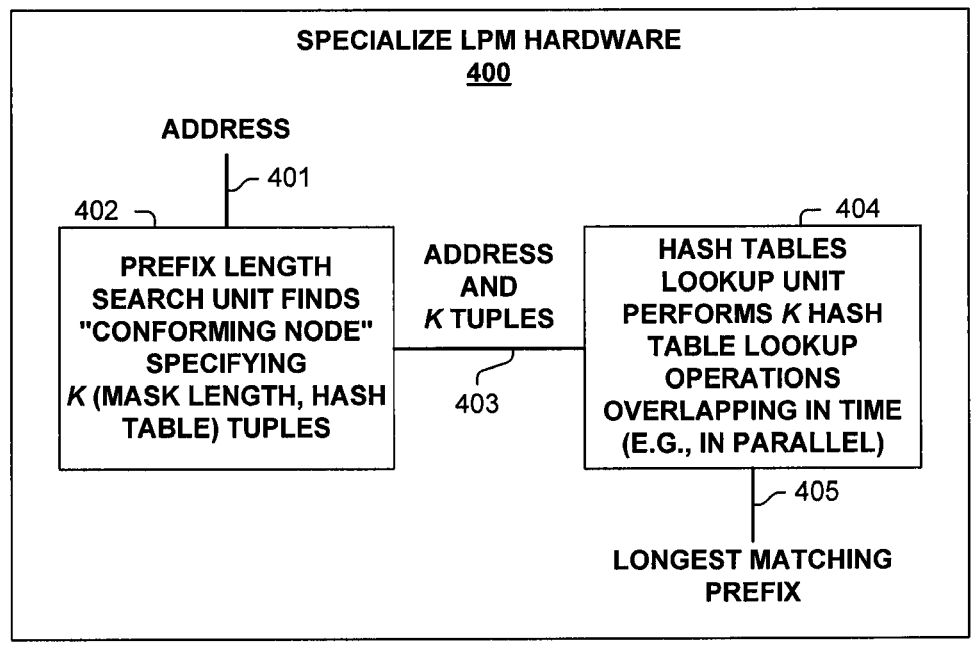
FIG. 4A illustrates a specialized longest prefix matching hardware according to one embodiment.

FIG. 4A illustrates a specialized longest matching prefix hardware architecture 400 according to one embodiment. As shown, an address 401 is received by prefix length search unit 402, which identifies a conforming code specifying K (mask length, hash table) tuples (403). Hash tables lookup unit 404 performs the corresponding K hash table lookup operations overlapping in time (e.g., in parallel), resulting in the identification of the longest matching prefix 405 (if any prefix matches). In one embodiment, prefix search unit uses a hardware ternary content-addressable memory (TCAM) to identify the conforming entry. Typically, the hardware TCAM searches each of its entries in parallel to identify the longest matching conforming node, if any, and if stored conforming node prefixes that can match an address are stored in longest to shortest priority order. In one embodiment, a trie data structure is traversed based on the address to identify a conforming node, if there is one that matches.

Figure 4B:
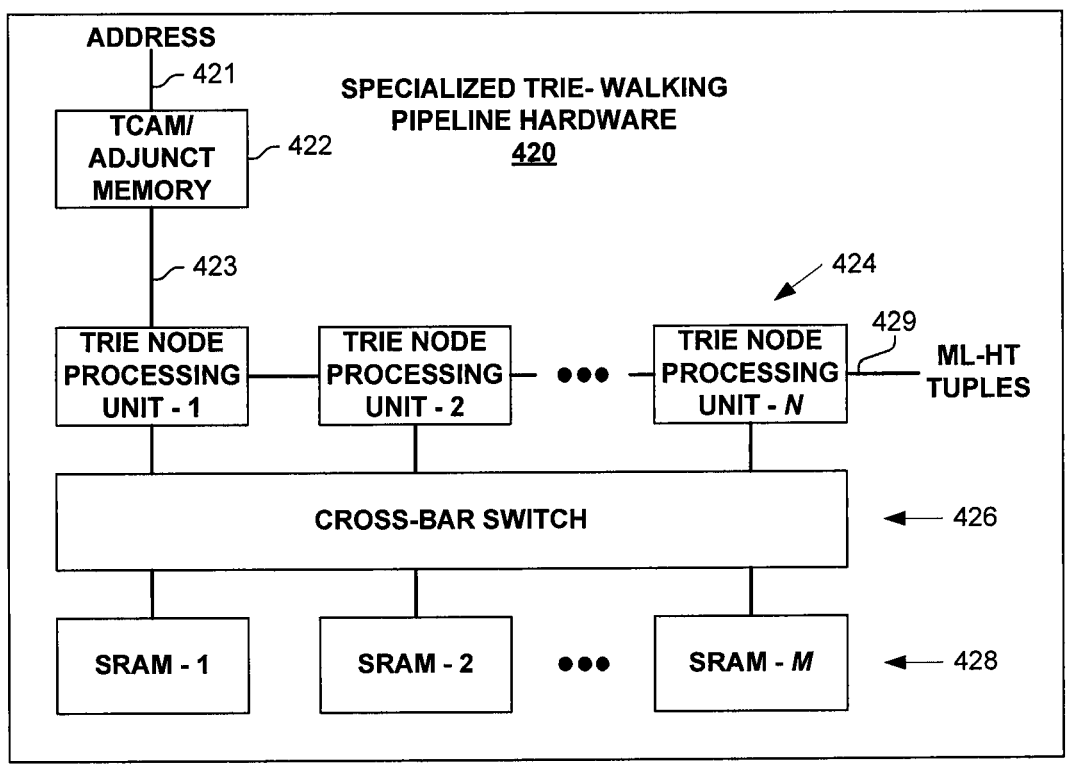
FIG. 4B illustrates a specialized trie-walking pipeline hardware according to one embodiment.

FIG. 4B illustrates specialized trie-walking pipeline hardware 420 according to one embodiment. In one embodiment, an address 421 is prepended with context information such as, but not limited to, a type identifier (e.g., IPv4, IPv6 or other address type) and/or a virtual routing and forwarding (VRF) identifier. One embodiment uses a hardware binary or ternary content-addressable memory and adjunct memory 422 to speed up a mask length lookup operation. The address (possibly with type and VRF) 421 is supplied to the content-addressable memory (422) with the matching result used as an address in the adjunct memory (422) to identifying a node (423) within a trie data structure from which to continue with the trie search. The trie data structure is then walked via a pipeline architecture including trie node processing units 424, cross-bar switch 426, and memories 428. Cross-bar switch 426 provides access by any of node processing units 424 to any of memories 428. Upon discovery of a matching conforming node (or a no match found), a result of the matching conforming node's one or more tuples of mask length and hash table are signaled (429), which in one embodiment is null if no matching conforming entry is found.

Figure 4C:
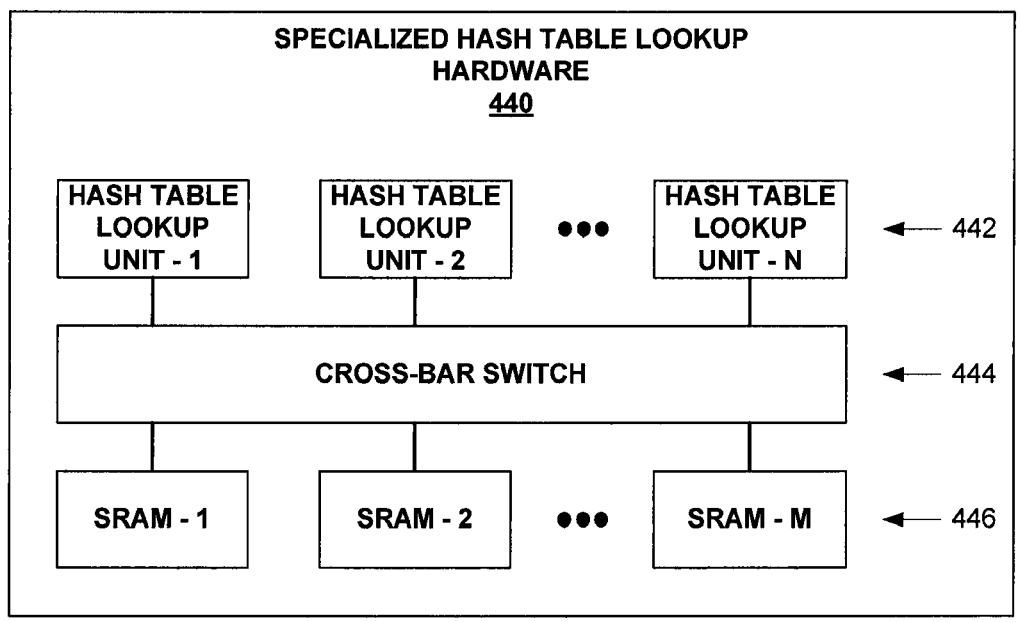
FIG. 4C illustrates a specialized hash table lookup hardware according to one embodiment.

FIG. 4C illustrates specialized hash table lookup hardware 440 according to one embodiment in which hash table lookup operations for a conforming node discovered via hardware 420 of FIG. 4B (or via another embodiment) are distributed among hash table lookup units 442. Based on received K tuples of mask length and identification of a hash table, K hash table lookup operations are performed in parallel by K hash table lookup units 442, each of which access the corresponding hash table stored in memory 446 via cross-bar switch 444. In one embodiment, each hash table lookup unit (442) is directly connected to one or more memories (446) (e.g., removing the need for cross-bar switch 444). In which case, each hash table lookup operation is correspondingly assigned to the hash table lookup unit (442) that has access to the hash table stored in the directly connected memory (446).

One embodiment, rather than using hash table lookup operations, uses direct memory lookup operations thus typically required significantly larger memories. One embodiment uses hash tables as they provide storage efficiencies (e.g., use a smaller memory footprint than required for using just memory addresses). Also, for a mask length identified by a conforming node, there might be multiple trie nodes under the conforming node in the full trie data structure with that same mask length. A hash table lookup operation efficiently distinguishes among these entries in a hash table. Also, in one embodiment, all hash tables associated with two different conforming nodes are different, even if they correspond to a same mask length. Thus, one embodiment uses more smaller hash tables (than a single large hash table if all same mask lengths had to be in a same hash table), which can be more efficiently allocated to memories 446. Also, each hash table associated with a conforming node is programmed in a different one of memories 446 for each of simultaneous hash table lookup operations. In one embodiment, the allocation of hash tables associated with a conforming node to memories 446 is done without regard to the location hash tables of different conforming nodes as there is no lookup timing conflict. Thus, there is great freedom in which memory 446 a hash table is stored, which can lead to additional efficiencies in operation for an embodiment, especially when the address space is very dynamic.

Figure 5A:
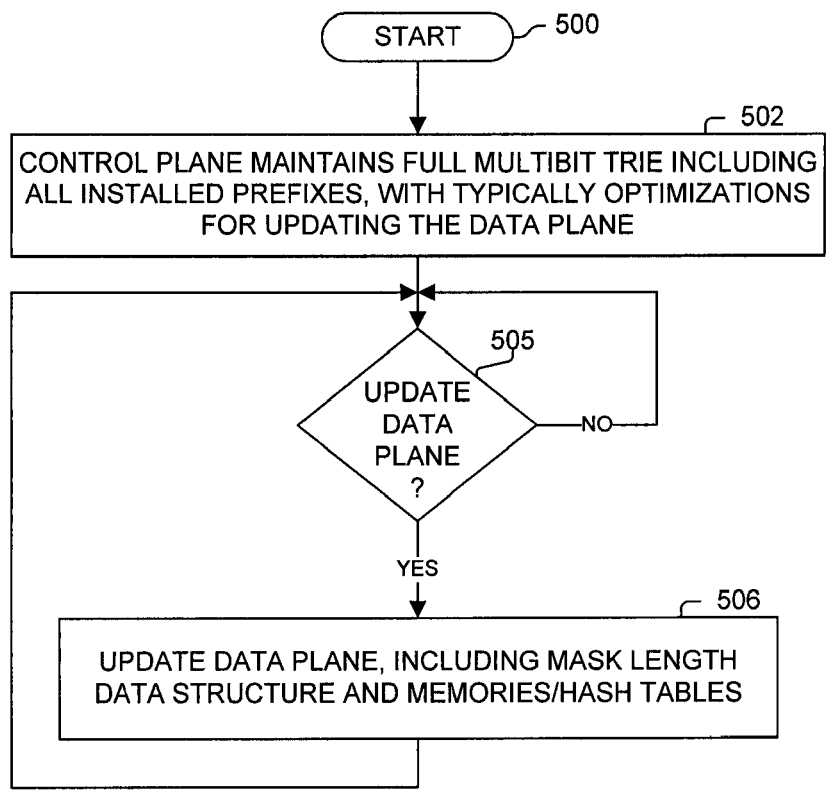
FIG. 5A illustrates a process according to one embodiment.

FIG. 5A illustrates a process performed in one embodiment. Processing begins with process block 500. In process block 502, the control plane continuously maintains a full multibit trie (e.g., in a RIB) that includes all installed prefixes (i.e., all prefixes in the address space), with typically optimizations for ease of updating the data plane. Processing remains at process block 505 until the data plane needs updating, wherein processing proceeds to process block 506. In process block 506, each of one or more FIBs in the data plane is updated accordingly, typically updating the mask length data structure and hash tables/memories. Processing returns to process block 505.

Figure 5B:
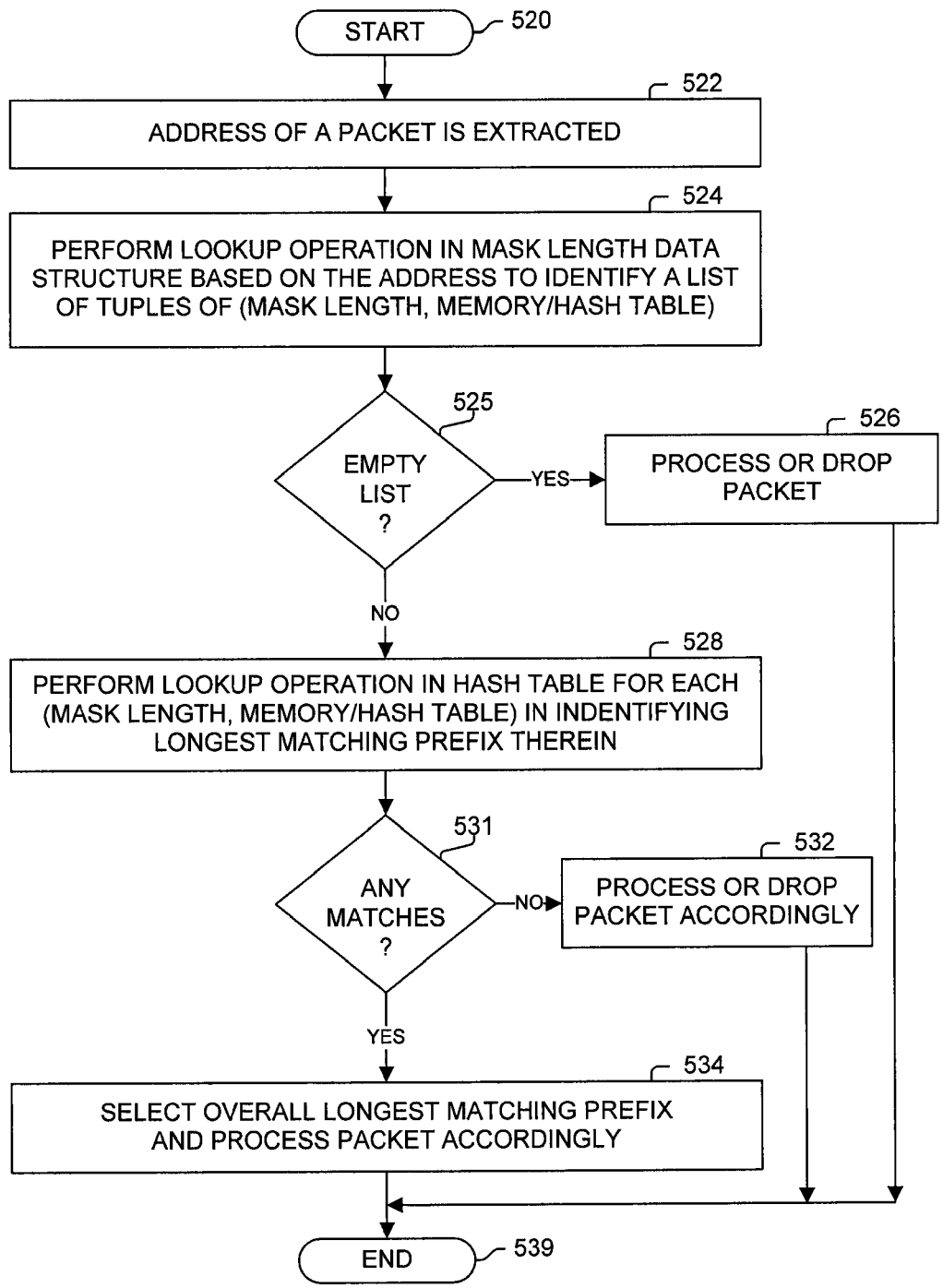
FIG. 5B illustrates a process according to one embodiment.

FIG. 5B illustrates a process performed in one embodiment. Processing begins with process block 520. In process block 522, an address, typically the IP destination address, of a packet is extracted. In process block 524, a lookup operation is performed in a mask length data structure to identify a list of tuples, each of which includes a mask length and an identification of a hash table and/or memory. As determined in process block 525, if this list is empty, then processing proceeds to process block 526, else processing proceeds to process block 528. In process block 526, the packet is normally processed or dropped when no matching address in the search space is located; and processing proceeds to process block 539. In process block 528, lookup operations are performed in parallel for each tuple in identifying a corresponding longest matching prefix. Next, as determined in process block 531, if no matching prefixes are located, then processing proceeds to process block 532; else processing proceeds to process block 534. In process block 532, the packet is normally processed or dropped when no matching address in the search space is located; and processing proceeds to process block 539. In process block 534, the longest of the matching prefixes identified in process block 528 is selected as the overall longest matching prefix, and processing proceeds to process block 539. As indicated by process block 539, processing of the flow diagram of FIG. 5B is complete.

Figure 6A:
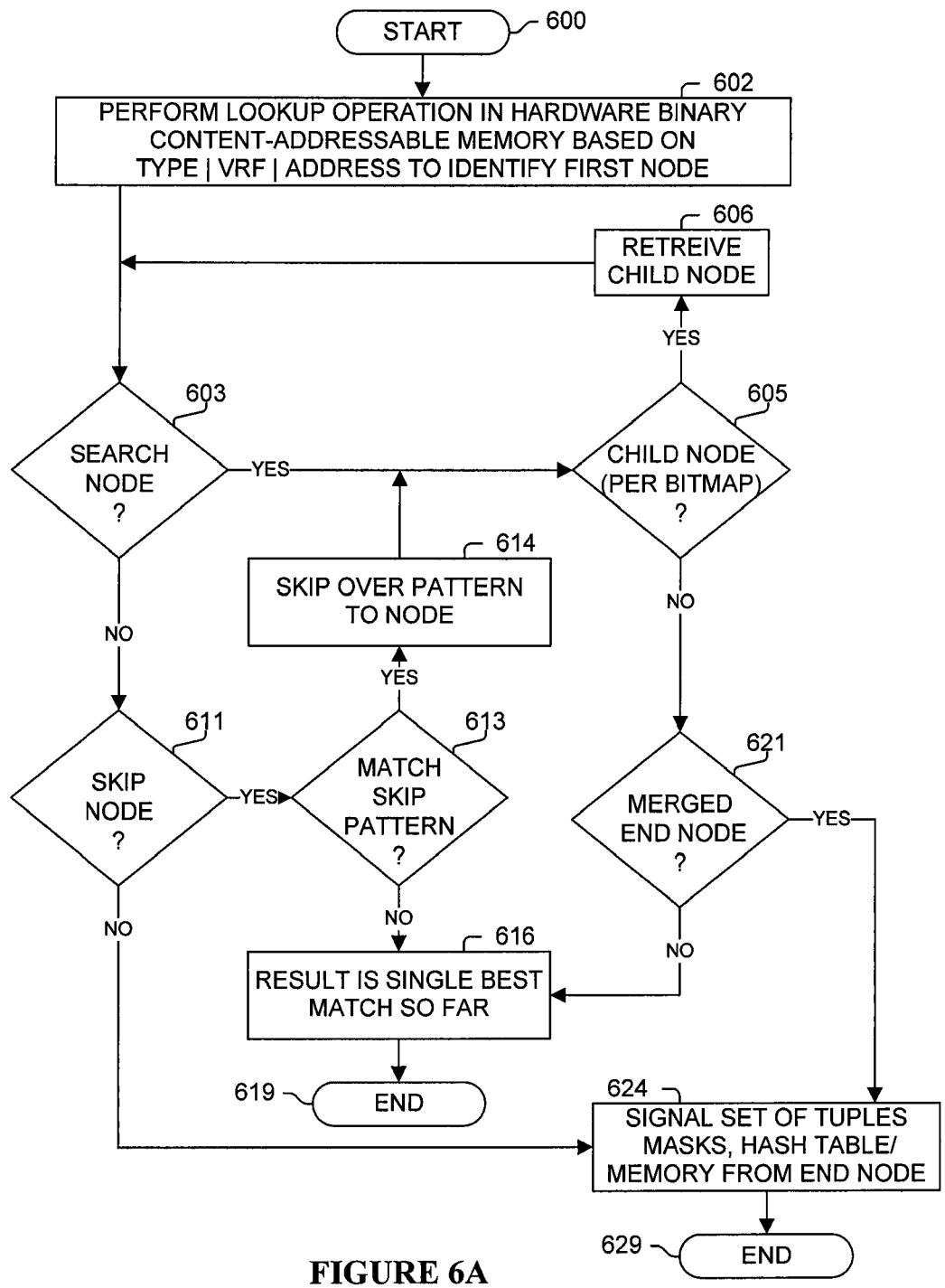
FIG. 6A illustrates a process according to one embodiment.

FIG. 6A illustrates a process performed in one embodiment to traverse a mask length data structure. In one embodiment, the mask length data structure is a multibit trie data structure using three node types of a search node (that does not have any installed prefix from the search space), a skip node (an optimization to skip over multiple search nodes in one operation), and end nodes.

Processing begins with process block 600. In process block 602, a lookup operation is performed in a hardware content-addressable memory based on a value of (type|VR-F|address) to identify a current trie node from which to continue searching.

As determined in process block 603, if the current node is a search node, then processing proceeds to process block 605; otherwise processing proceeds to process block 611. As determined in process block 605, if the current search node includes a reference to a child node matching the address, then this child node is retrieved (in process block 606) and processing returns to process block 603.

As determined in process block 611, if the current node is a skip node, then processing proceeds to process block 613; else processing proceeds to process block 624. As determined in process block 613, if the address matches a skip pattern in the current skip node, then processing proceeds to process block 614 to perform the skip operation including retrieving the next node with processing proceeding to process block 605.

As determined in process block 621, if the current node is not a merged end node (an optimization), then processing proceeds to process block 616, else to process block 624. In process block 616, the mask length and hash table to be searched is that associated with a previous matching node, and processing of the flow diagram of FIG. 6A is complete as indicated by process block 619.

In process block 624, the set of tuples of mask length, hash table/memory is signaled; and processing of the flow diagram of FIG. 6A is complete as indicated by process block 629.

Figure 6B:
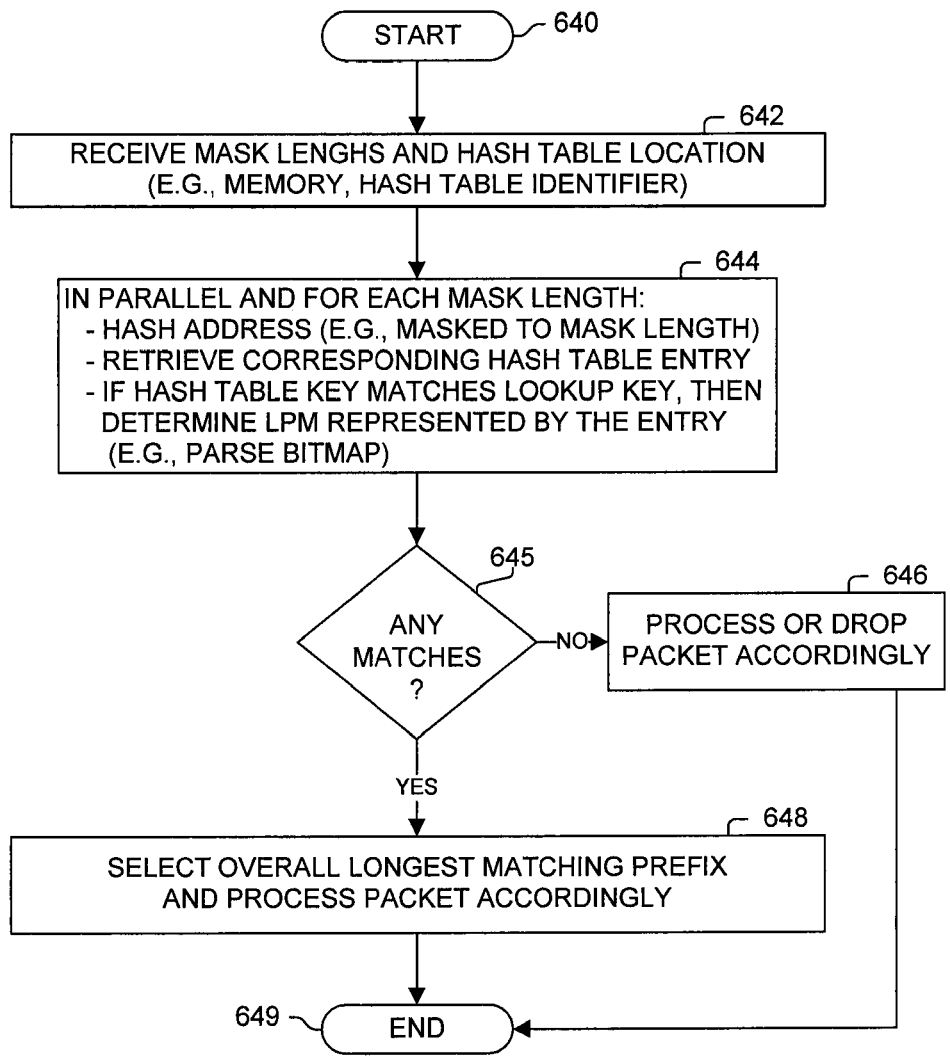
FIG. 6B illustrates a process according to one embodiment.

FIG. 6B illustrates a process performed in one embodiment to simultaneously perform one or more hash table lookup operations. Processing begins with process block 640. In process block 642, one or more tuples of mask length, hash table/memory. In process block 644, in parallel and for each mask length a hash table lookup operation is performed in a corresponding hash table. In one embodiment, the hash table lookup operation includes hashing the address masked corresponding to the mask/prefix length; a corresponding hash table entry is retrieved; if the hash key matches the lookup key, then the longest prefix match associated with the hash table entry is determined (e.g., based on a bitmap of installed prefixes in the address space). As determined in process block 645, if there are no matching prefixes, then processing proceeds to process block 646; else processing proceeds to process block 648. In process block 646, the packet is normally processed or dropped when no matching address in the search space is located; and processing proceeds to process block 649. In process block 648, the overall longest matching prefix is selected, and the packet is processed accordingly. As indicated by process block 649, processing of the flow diagram of FIG. 6B is complete.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
   determining, by a packet processing apparatus based on a particular prefix generated based on a particular packet, a particular conforming entry of a plurality of stored conforming entries, with each specific conforming entry of the plurality of stored conforming entries representing a specific search space including one or more installed specific prefixes with each said installed specific prefix comprising a same prefix of said specific conforming entry and with one or more mask lengths identifiable based on said specific conforming entry;
   determining an overall longest matching prefix from a lookup result of a hash table lookup operation performed based on said determined particular prefix for each particular mask length identifiable based on said determined particular conforming entry in a respective hash table of a plurality of hash tables, with the respective hash table including one or more entries representing one or more of said installed prefixes in said search space said represented by said determined particular conforming entry; and
   processing, by the packet processing apparatus, the particular packet based on processing information associated with said determined overall longest matching prefix.

2. The method of claim 1, wherein an individual number of different said mask lengths identifiable based on each said specific conforming entry is less than or equal to a predetermined number of mask lengths; wherein the predetermined number of mask lengths is less than or equal to a number of a plurality of different hash tables that can be searched overlapping in time by the packet processing apparatus.

3. The method of claim 2, wherein a particular individual number of different said mask lengths identifiable based on the particular conforming entry is at least two; and wherein said hash table lookup operations are performed overlapping in time.

4. The method of claim 1, wherein a particular individual number of different said mask lengths identifiable based on the particular conforming entry is at least two; and wherein said hash table lookup operations are performed overlapping in time.

5. The method of claim 1, wherein an individual number of different said mask lengths identifiable based on each said specific conforming entry is less than or equal to a predetermined number of mask lengths; wherein the predetermined number of mask lengths is less than or equal to a number of a plurality of different memories that can be accessed overlapping in time by the packet processing apparatus.

6. The method of claim 5, wherein a particular individual number of different said mask lengths identifiable based on the particular conforming entry is at least two; and wherein said hash table lookup operations are performed overlapping in time.

7. The method of claim 1, wherein a mask length data structure comprises a data plane multibit trie data structure that includes the plurality of stored conforming entries; and wherein said determining the particular conforming entry includes traversing the data plane multibit trie data structure to the particular conforming entry.

8. The method of claim 1, wherein a prefix length of the overall longest matching prefix is longer than each particular mask length identifiable based on said determined particular conforming entry.

9. The method of claim 1, wherein said hash table lookup operation performed based on said determined particular prefix for each particular mask length includes resulting in the identification of a particular hash table entry representing said determined overall longest matching prefix; wherein the particular hash table entry is associated with a specific mask length of said one or more mask lengths identifiable based on said determined particular conforming entry; and wherein a mask length of said determined overall longest matching prefix is longer than the specific mask length.

10. The method of claim 1, wherein a prefix length of the overall longest matching prefix is longer than each particular mask length identifiable based on said determined particular conforming entry.

11. A method, comprising:
    performing a lookup operation in a mask length data structure, by a packet processing apparatus based on a lookup prefix identified based on a packet, resulting in the identification of a particular conforming entry with a particular prefix that matches the lookup prefix, with the particular conforming entry being associated with a particular plurality of mask lengths of installed prefixes matching the particular prefix;
    for each particular mask length in the particular plurality of mask lengths, performing a hash table lookup operation, overlapping in time, in a respective searchable hash table associated with said particular mask length resulting in the identification of one or more first prefixes matching the lookup prefix; and
    processing, by the packet processing apparatus, the packet based on processing information associated with a longest matching prefix of said one or more first prefixes.

12. The method of claim 11, wherein the mask length data structure comprises a data plane multibit trie data structure that includes the particular conforming entry; and wherein said performing the lookup operation includes traversing the data plane multibit trie data structure to the particular conforming entry.

13. A method, comprising:
    determining, by a packet processing apparatus, an identification of a particular plurality of mask lengths based on a particular conforming node identified via traversing a data plane multibit trie data structure based on a particular address of a packet, with the data plane multibit trie data structure terminating each of a plurality of branches with a conforming node of a plurality of conforming nodes, with a conforming node being defined as a node that specifies at least one but less than or equal to a predetermined number of mask lengths for searching an address search space, with the address search space referring to installed prefixes for matching a lookup value, with a first of the plurality of branches being a first length and terminating in particular conforming node of the plurality of conforming nodes, with a second of the plurality of branches being a different length than the first length and terminating in a second conforming node of the plurality of conforming nodes;

determining, by the packet processing apparatus, a longest matching prefix based on the results of a plurality of hash table lookup operations performed overlapping in time and including one hash table lookup operation for each of the particular plurality of mask lengths in a different hash table, and with the longest matching prefix being identified from a particular hash table entry identified by the plurality of hash table lookup operations; and processing, by the packet processing apparatus, the particular packet based on said determined longest matching prefix.

14. The method of claim 13, wherein each of the plurality of conforming nodes directly or indirectly refers to one or more of the plurality of hash tables.

15. The method of claim 14, wherein none of the plurality of conforming nodes directly or indirectly refers to a same hash table of the plurality of hash tables.

16. The method of claim 13, wherein the particular hash table entry represents a plurality of said installed prefixes including the longest matching prefix; wherein the particular hash table entry is in a particular hash table of said different hash tables, with the particular hash table corresponding to a specific mask length of the particular plurality of mask lengths; and wherein the longest matching prefix is longer than the specific mask length.

* * * * *